United States Patent [19]
Binder et al.

[11] Patent Number: 6,058,605
[45] Date of Patent: May 9, 2000

[54] RECTANGULAR TUBE TRIMMING PROCESS AND APPARATUS

[75] Inventors: Gerald Robert Binder, Sterling Heights; Bruce Daniel Kocer, Oxford, both of Mich.

[73] Assignee: The Budd Company, Troy, Mich.

[21] Appl. No.: 08/902,713

[22] Filed: Jul. 30, 1997

[51] Int. Cl.[7] ..................................................... B23P 15/00
[52] U.S. Cl. .............................................. 29/897.2; 83/54
[58] Field of Search ........................... 29/897.2, 890.14, 29/890.149, 890.144, 425, 455.1; 83/581, 684, 691, 692, 693, 51, 54, 618, 917

[56] References Cited

U.S. PATENT DOCUMENTS

| | | | |
|---|---|---|---|
| 3,057,240 | 10/1962 | De Witt | 83/412 |
| 3,074,302 | 1/1963 | Coulon et al. | 83/40 |
| 4,236,473 | 12/1980 | Belt | 113/116 MA |
| 4,930,834 | 6/1990 | Nakatsuji | 83/54 |
| 4,974,436 | 12/1990 | Nakatsuji | 72/326 |

*Primary Examiner*—David P. Bryant
*Assistant Examiner*—Marc W. Butler
*Attorney, Agent, or Firm*—Harness, Dickey & Pierce, P.L.C.

[57] ABSTRACT

A process for forming angled trim lines on vehicle frame cross members to mate and secure the ends of the cross members with frame side rail members with a high degree of accuracy and in a cost efficient manner. The process includes the steps of removing portions of the end of a rectangular tube to form angled trim lines and connecting the angled trim lines with the frame side rail member. A cam trimming die is used to form the angled trim lines. The die includes substantially symmetrical drivers, slide cams, and filler cams. The drivers move the slide cams and filler cams in opposing directions. The slide cams carry cutting steels that form the angled trim lines as the slide cam moves. The filler cams support the rectangular tube and produce a sheering effect with the cutting steels as they move past one another. The present invention simplifies and expedites the formation of trim lines on the ends of the rectangular cross members as well as obviates the need for expensive laser trimming and plasma arcing tools to form the trim lines on the cross member ends.

12 Claims, 5 Drawing Sheets

RECTANGULAR TUBE TRIMMING PROCESS AND APPARATUS

BACKGROUND OF THE INVENTION

1. Technical Field

The present invention relates generally to a tube trimming technique and specifically to a process and apparatus that forms trim lines on the end of a rectangular tube for frame assembly purposes.

2. Discussion

In motor vehicle frame construction applications, it is well known to shape the ends of frame cross members so that the cross member ends can be fitted to frame side rail members with a high degree of accuracy. Once the frame cross members are mated with the frame side rail members, the cross members are secured to the side rail members via well known techniques, such as welding or brazing.

Techniques for forming trim lines on tubular cross member ends are well known in the art. Typically, these techniques form the trim lines by a laser trimming or plasma arcing process. Significant disadvantages of the traditional processes include the high associated cost of lasers and other equipment required to implement the processes and the slow cycle time required to achieve the desired trim lines.

Examples of traditional techniques for making strategic cuts in tubing are disclosed in U.S. Pat. No. 4,974,436 entitled "Cutting Tool to Facilitate Bending of Hollow Tubing" which issued to Nakatsuji on Dec. 4, 1990; and U.S. Pat. No. 4,930,384 entitled "Die for Notching Hollow Tubing" which issued to Nakatsuji on Jun. 5, 1990. An example of a traditional process of mitering tube ends is disclosed in U.S. Pat. No. 3,074,302 entitled "Method of Preparing Mitered Tubular Joints" which issued to Coulon et al. on Jan. 22, 1963. However, these techniques suffer one or more problems which do not lend themselves to high volume production of the products contemplated by the present invention.

SUMMARY OF THE INVENTION

The present invention provides a process for assembling a rectangular tube to another rectangular member. The invention finds particular utility for forming angled trim lines on vehicle frame cross members to mate and secure the ends of the cross members with frame side rail members with a high degree of accuracy and in a cost efficient manner. The process includes the steps of removing portions of the end of a rectangular tube to form angled trim lines and connecting the angled trim lines with the frame side rail member. The process simplifies and expedites the formation of trim lines on the ends of rectangular tubes. The process also obviates the need for expensive laser trimming and plasma arcing tools. Instead, less expensive tools, such as cam trimming dies can be used to form the trim lines on the cross member ends.

The process of the present invention contemplates the use of a cam trimming die to form the angled trim lines on the rectangular tube. The cam trimming die primarily includes substantially symmetrical drivers, slide cams and filler cams. The drivers move the slide cams and the filler cams in opposite directions. The slide cams carry cutting steels for forming the angled trim lines. The filler cams support the rectangular tube and produce a sheering effect with the cutting steels as they move past one another. The opening on the end of the rectangular tube is placed over the cutting steels of the slide cams. As the slide cams move, the cutting steels form the angled trim lines. Since the cutting steels are positioned inside of the rectangular tube, the metal being trimmed away falls outside the tube, allowing easier and more efficient removal of the scrap metal.

The process of the present invention also contemplates starting with an alternative embodiment of the rectangular tube, where the rectangular tube would be mitered at a predetermined angle. Preferably, the rectangular tube is pre-cut at an angle of about 45°. The mitered end of the rectangular tube should be deburred and treated to remove cut off deformity prior to forming the trim lines on the end.

The rectangular tube trimming process of the present invention is further advantageous over the conventional process, as the present invention does not require high capital costs and is not plagued with slow cycle time. Additional advantages and features of the present invention will become apparent from the following description and appended claims, taken in conjunction with the accompanying drawings.

DETAILED DESCRIPTION OF THE PREFERRED EMBODIMENT

It should be understood that this invention will be described in connection with a specific example of the best mode of practicing the invention currently contemplated by the inventor. However, it should be realized that the scope of this invention is not to be limited to this specific example since, in this case, the invention has broad applicability to joining rectangular tubes to members of various shapes—not just applicability to joining members in a vehicle frame assembly.

Figure 1:
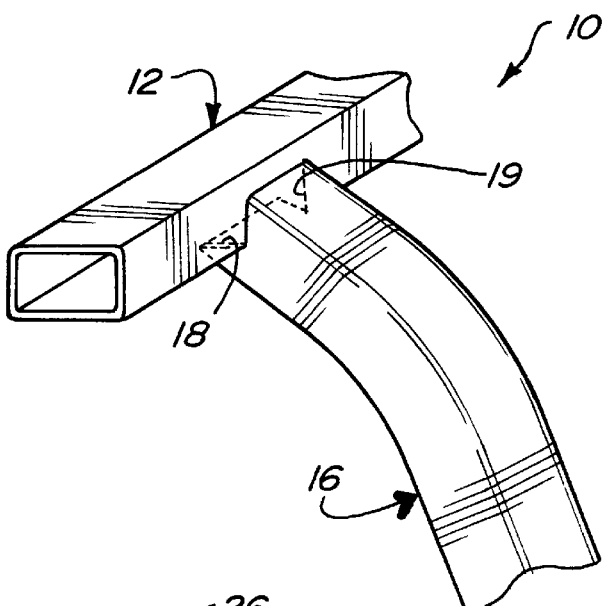
FIG. 1 is a perspective view of a preferred embodiment of a portion of a vehicle frame assembly, including frame cross members having angled trim lines formed by the process of the present invention.

Referring to FIG. 1, a portion of an automobile body frame 10 is shown generally. The frame 10 generally includes a longitudinal side rail member 12 interconnected to a cross member 16. Side rail member 12 is preferably a lightweight, steel member having a rectangular cross-section. Cross member 16 is preferably also a lightweight, steel member having a rectangular cross-section. Cross member 16 includes trim lines 18, 19 formed by the tube trimming process of the present invention which is described in detail below. Trim lines 18, 19 are preferably trimmed to form 90° angles. However, trim lines 18, 19 may be trimmed to form any angular or arcuate trim line necessary for the desired joining application. Additionally, trim line 18 may be formed at one angular or arcuate trim line and trim line 19 formed at another angular or arcuate trim line. Cross-member 16 is secured to an exterior surface of side rail member 12 at trim lines 18, 19 via welding, brazing or any other conventional metal bonding technique.

It should be appreciated that both side rail member 12 and cross member 16 may be formed from materials such as high density plastic, aluminum or any other material having the desired structural support properties for a particular application. While it is contemplated that the method of the present invention is to be used to secure cross members to side rail members to form an automobile body frame, the method may be adapted to form any type of structure, especially those requiring load-bearing support members to be interconnected with a high degree of accuracy.

Figure 2:
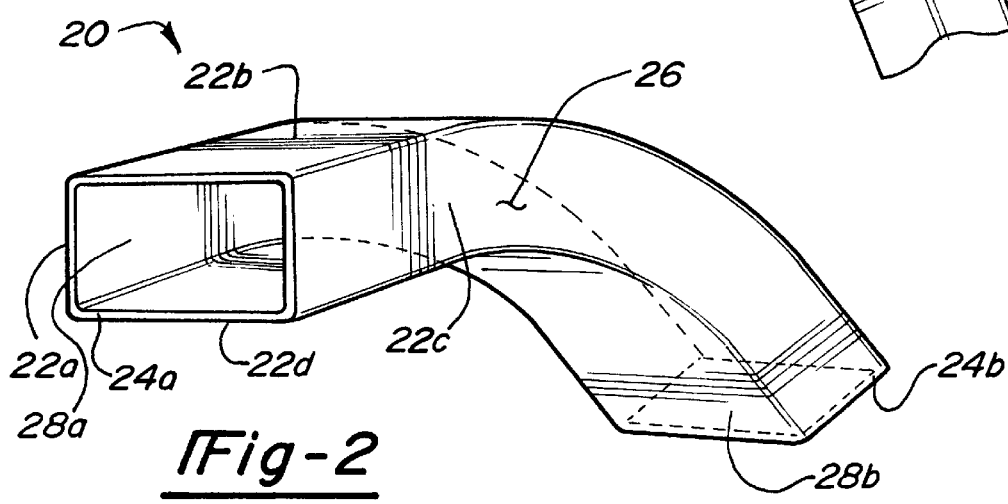
FIG. 2 is a perspective view of a preferred embodiment of a tubular, rectangular cross member.

Referring now to FIG. 2, an isolated view of tubular, rectangular cross member 16 of FIG. 1 is shown prior to the tube end being trimmed by the process of the present invention. The pre-processed rectangular tube 20 includes longitudinally planar side surfaces 22a–22d and first and second planar ends 24a, 24b. Side surfaces 22a–22d define a tubular channel 26 therebetween. Channel 26 extends throughout the length of rectangular tube 20 from a channel opening 28a, defined by first planar end 24a, to a channel opening 28b, defined by second planar end 24b. The length and width of rectangular tube 20 may vary according to the dimension requirements of the particular vehicle model and make. However, the internal width of rectangular tube 20 is preferably at least 3 inches to allow proper operation of the cam trim die 30 of the present invention which is described in detail below.

Figure 3:
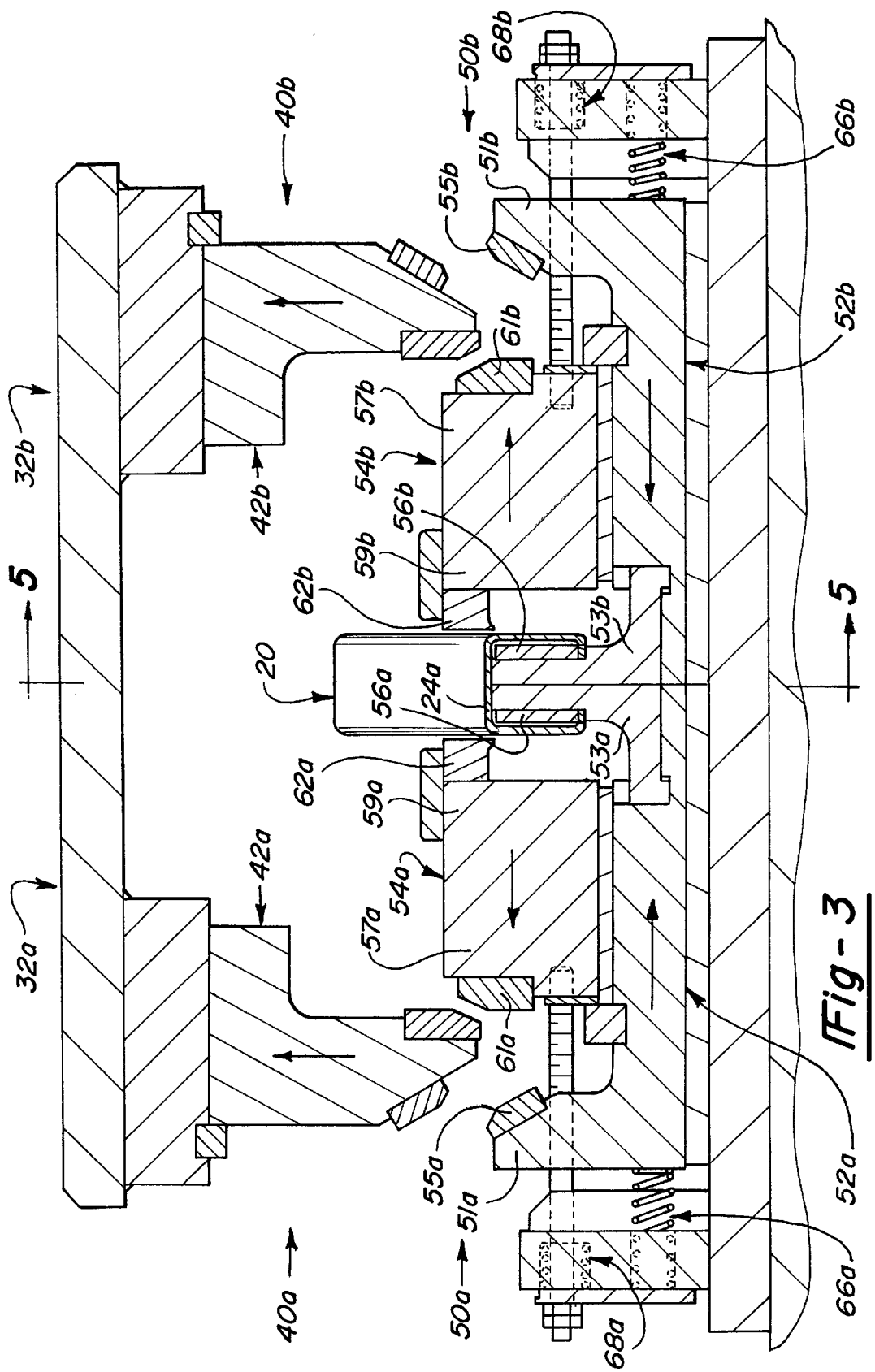
FIG. 3 is a front elevational view of a preferred embodiment of a cam trimming die in a rested position for forming angled trim lines on rectangular tubes by the process of the present invention.

FIG. 3 illustrates a preferred embodiment of cam trim die 30 used to form 90° angled trim lines 18, 19 on rectangular tube 20. Cam trim die 30 includes first and second sides 32a, 32b. First and second sides 32a, 32b are substantially symmetrical to each other. Accordingly, first side 32a has an upper punch portion 40a and a lower die portion 50a, and second side 32b, likewise, has an upper punch portion 40b and a lower die portion 50b. Upper punch portions 40a, 40b include drivers 42a, 42b, respectively, which are actuated by traditional mechanical or pneumatic methods such as by way of a ram driven by a press (not shown). Lower die portions 50a, 50b include slide cams 52a, 52b, respectively, and filler cams 54a, 54b, respectively. Slide cams 52a, 52b have first and second ends 51a, 51b and 53a, 53b, respectively. First ends 51a, 51b include first driver contact members 55a, 55b, respectively. Second ends 53a, 53b include cutting steels 56a, 56b, respectively. Filler cams 54a, 54b have first and second ends 57a, 57b and 59a, 59b, respectively. First ends 57a, 57b include second driver contact members 61a, 61b, respectively. Second ends 59a, 59b include sheering supports 62a, 62b, respectively.

Figure 4:
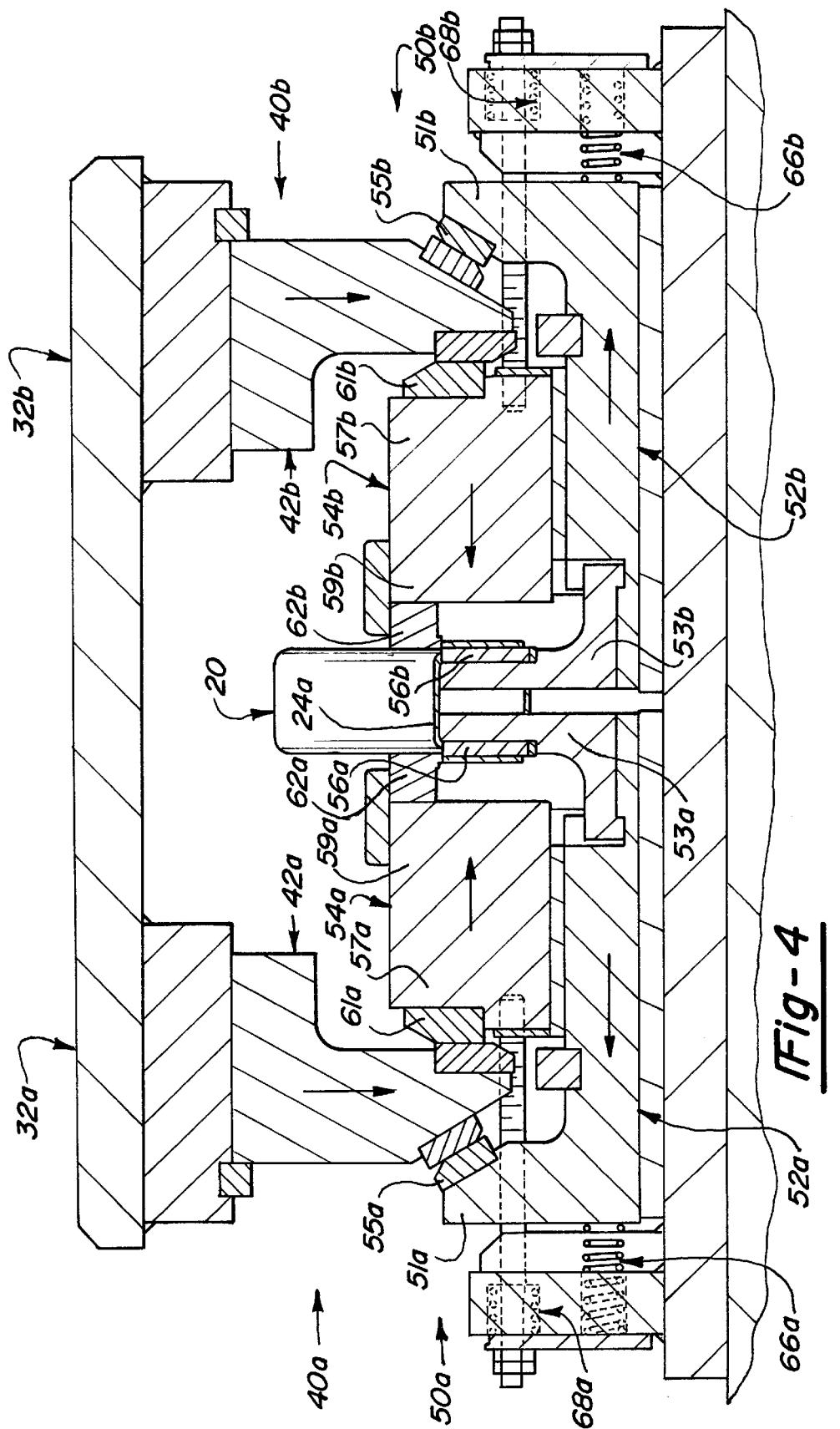
FIG. 4 is a front elevational view of the cam trimming die shown in FIG. 3 in an actuated position.
Figure 5:
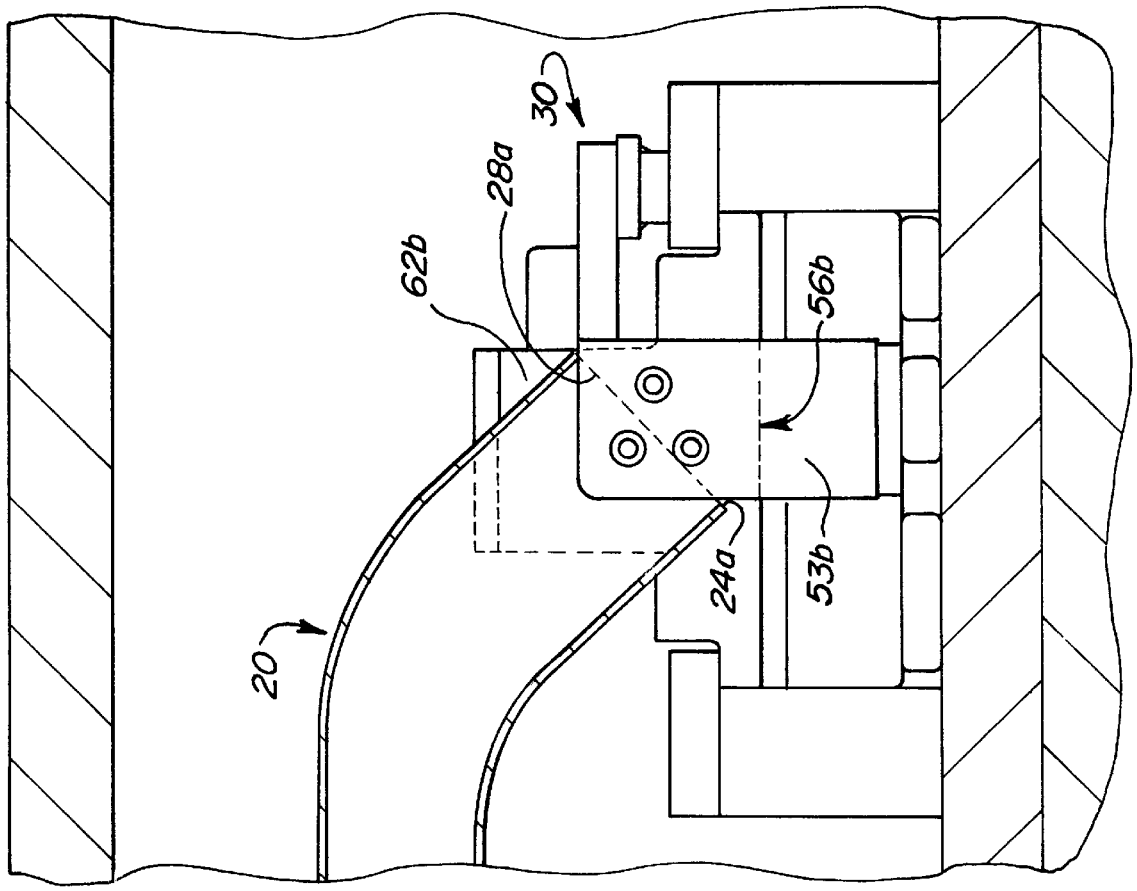
FIG. 5 is a cross-sectional view taken along the line 5—5 of FIG. 3.

Referring now to FIGS. 3–5, channel opening 28a (defined by first planar end 24a) of rectangular tube 20 is placed over second ends 53a, 53b of slide cams 52a, 52b. FIG. 3 illustrates cam trim die 30 in its initial rested position. Slide cams 52a, 52b are maintained in their initial rested positions by first return spring members 66a, 66b, respectively. Filler cams 54a, 54b are maintained in their initial rested positions by second return spring members 68a, 68b, respectively. Drivers 42a, 42b, after actuation, make contact with first driver contact members 55a, 55b, respectively, of slide cams 52a, 52b, and second driver contact members 61a, 61b, respectively, of filler cams 54a, 54b, causing movement of slide cams 52a, 52b away from rectangular tube 20 and filler cams 54a, 54b towards rectangular tube 20. When slide cams 52a, 52b move, cutting steels 56a, 56b move likewise, forming trim lines 18, 19. When filler cams 54a, 54b move in the opposite direction, sheering supports 62a, 62b move likewise, supporting rectangular tube 20 and producing a sheering effect with cutting steels 56a, 56b. Because the present invention contemplates having cutting steels 56a, 56b located within rectangular tube 20 at the beginning of the process, the metal trimmed from rectangular tube 20 is pushed outside the tube, allowing easier and more efficient removal of the trimmed-out metal. FIG. 4 illustrates cam trim die 30 in its fully actuated position. FIG. 5 is a cross-sectional view showing channel opening 28a of rectangular tube 20 placed over second ends 53a, 53b of side cams 52a, 52b.

Figure 6:
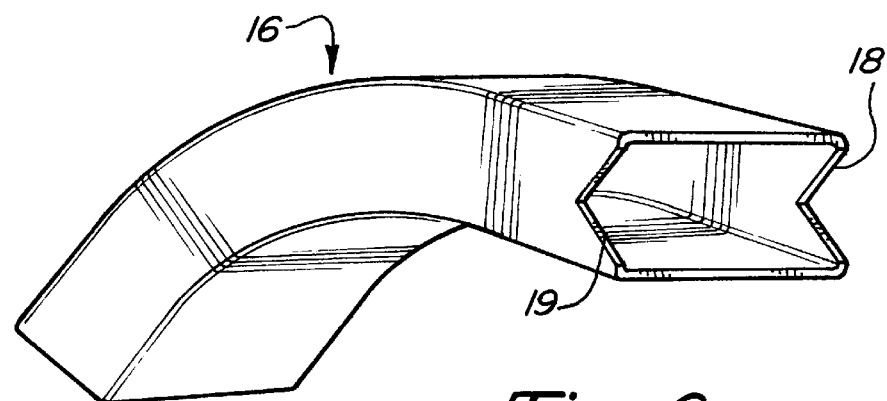
FIG. 6 is a perspective view showing the tubular, rectangular cross member of FIG. 2 having angled trim lines formed by the process of the present invention.

Resulting tubular, rectangular cross member 16 is shown in FIG. 6. Although trim lines 18, 19 are cut at 90° angles to mate with the angled exterior surface of side rail member 12, it should be appreciated that trim lines 18, 19 may be trimmed to conform to any requisite shape of the side rail member, as well as trimmed at angular or arcuate trim lines that are different from one another.

Figure 7:
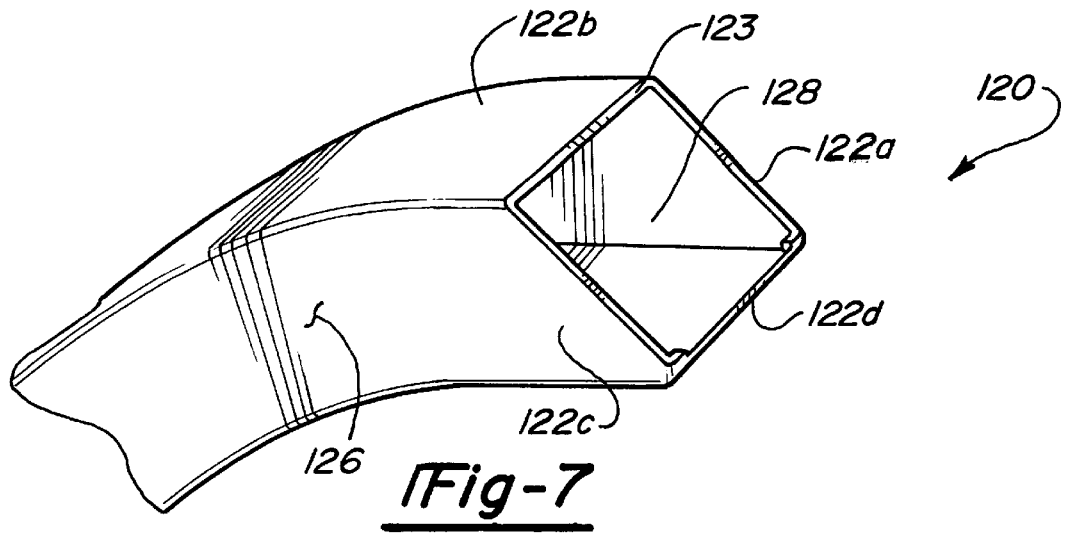
FIG. 7 is a perspective view of an alternate embodiment of a tubular, rectangular cross member.
Figure 8:
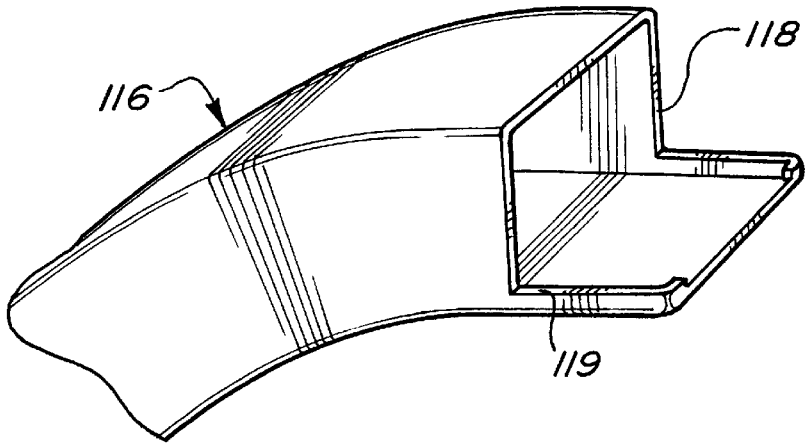
FIG. 8 is a perspective view showing the tubular, rectangular cross member of FIG. 7 having angled trim lines formed by the process of the present invention.

Referring now to FIG. 7, an isolated view of an alternative embodiment of tubular, rectangular cross-member 16 of FIG. 1 is shown prior to the tube end being trimmed by the process of the present invention. The pre-processed rectangular tube 120 has features equivalent to rectangular tube 20 as illustrated in FIG. 2, except rectangular tube 120 has a mitered end 123 instead of first planar end 24a as indicated on rectangular tube 20. Preferably, mitered end 123 is cut at an angle of about 45°. However, mitered end 123 may be cut at any angle required to mate the trimmed mitered end to a mounting surface. Deformities and metal burrs remaining on rectangular tube 120 after the angle has been cut can impede the tube trimming process of the present invention. Therefore, mitered end 123 is treated to remove burrs and cut-off deformities prior to the formation of trim lines on mitered end 123. Rectangular tube 120 is then subjected to the tube trimming process of this invention. The resulting tubular, rectangular cross member 116, with trim lines 118, 119, is illustrated in FIG. 8. In the automotive industry, it is contemplated that the tube manufacturer has the equipment and resources to readily form the deburred mitered tube which would then be shipped to the frame maker, who would perform the tube trimming process of this invention.

As can be appreciated from the foregoing, forming trim lines on vehicle frame cross members is often an expensive and slow process. However, according to the process of the present invention, a simpler, faster and more cost efficient means, like cam trimming, may be used to form trim lines on the ends of rectangular tubes.

The foregoing discussion discloses and describes merely an exemplary embodiment of the present invention. One skilled in the art will readily recognize from such discussion, and from accompanying drawings and claims, that various changes, modifications and variations can be made therein without departing from the spirit and scope of the invention as defined in the following claims.

What is claimed is:

1. A method of assembling a rectangular tube to a member having an angled exterior surface, said method comprising the steps of:

(a) providing a cam trim die having a pair of drivers, a pair of slide cams, and a pair of filler cams, each of said slide cams having a cutting section, each of said filler cams having a sheering support;

(b) positioning the rectangular tube in said cam trim die such that said sheering supports are positioned substantially outside said rectangular tube adjacent opposing sides of said rectangular tube and said cutting steels are positioned substantially within said rectangular tube adjacent said opposing sides;

(c) moving said drivers such that said drivers engage said filler cams and inwardly drive said sheering supports toward said opposing sides of said rectangular tube and simultaneously engage said slide cams and outwardly drive said cutting sections to produce a shearing effect between said sheering supports and said cutting sections to form angled trim lines on said opposing sides of the rectangular tube;

(d) mating said angled trim lines of said rectangular tube with said angled exterior surface of said member; and (e) securing said angled trim lines to said angled exterior surface.

2. The method of claim 1 wherein each of said angled trim lines on said opposing sides of the rectangular tube is different from the other.

3. A method of forming trim lines on a structural support cross member, said method comprising the steps of:

(a) providing a cam trim die having a pair of drivers, a pair of slide cams, and a pair of filler cams, each of said slide cams includes a cutting steel for independently forming a trim line and each of said filler cams includes a sheering block for supporting the cross member as said cutting steels form said trim lines;

(b) positioning the cross member in said cam trim die such that said sheering blocks are substantially positioned outside opposing sides of the cross member and said cutting steels are positioned inside the cross member;

(c) actuating said drivers such that said drivers engage said filler cams and cause said sheering blocks to move toward the cross member and said drivers engage said slide cams and cause said cutting steels to move in an opposite direction relative to said sheering blocks to produce a shearing effect between said sheering blocks and said cutting steels to form said trim lines;

(d) mating said trim lines of the cross member with an angled side rail member; and (e) securing said trim lines of the cross member to an exterior surface of said angled side rail member.

4. The method of claim 3 further comprising the step of repeating steps (a)–(e) for a plurality of cross members and side rail members to form a vehicular frame.

5. The method of claim 3 wherein said structural support cross member is rectangular in cross-section.

6. The method of claim 3 wherein said angled side rail member is rectangular in cross-section.

7. The method of claim 3 wherein said step of securing said cross member to said side rail member is accomplished by a metal bonding technique.

8. The method of claim 3 wherein each of said cutting steels defines a unique cutting path relative to the other.

9. A method of forming trim lines on a rectangular tube, said method comprising the steps of:

(a) cutting an oblique end on the rectangular tube at an angle to form a mitered end;

(b) positioning the rectangular tube in a cam trim die, said cam trim die having a pair of drivers, a pair of slide cams, and a pair of filler cams, each of said slide cams having a cutting section, each of said filler cams having a sheering support, the rectangular tube being positioned in said cam trim die such that said sheering supports are substantially outside opposing sides of the rectangular tube and said cutting steels are substantially within the rectangular tube adjacent said opposing sides;

(c) moving said drivers such that said drivers engage said filler cams and inwardly drive said sheering supports toward said opposing sides of said rectangular tube and simultaneously engage said slide cams and outwardly drive said cutting sections to produce a shearing effect between said sheering supports and said cutting sections to form the angled trim lines on said opposing sides of the rectangular tube;

(d) mating said trim lines of said mitered end of the rectangular tube with a member having at least one angled exterior surface; and (e) securing said trim lines to said at least one angled exterior surface.

10. The method of claim 9 wherein said mitered end is cut at a predetermined angle.

11. The method of claim 9 wherein said member having at least one angled exterior surface is rectangular in cross-section.

12. The method of claim 9 wherein each of said angled trim lines is different from the other.

\* \* \* \* \*

UNITED STATES PATENT AND TRADEMARK OFFICE
CERTIFICATE OF CORRECTION

PATENT NO. : 6,058,605
DATED : May 9, 2000
INVENTOR(S) : Gerald Robert Binder, et al.

It is certified that error appears in the above-indentified patent and that said Letters Patent is hereby corrected as shown below:

ON THE TITLE PAGE, [56] References Cited, add:

--3,709,082 1/1973 Leska
2,776,003 1/1957 Koster
3,979,809 9/1976 Schneider
3,073,195 1/1963 Koster--

Column 1, line 27, "No" should be -- Nos. --

Column 5, line 13, claim 1, "shearing" should be -- sheering --

Column 6, line 30, claim 9, "shearing" should be -- sheering --

Signed and Sealed this

Twenty-seventh Day of March, 2001

*Attest:*

NICHOLAS P. GODICI

*Attesting Officer*  *Acting Director of the United States Patent and Trademark Office*